(12) United States Patent
Turner et al.

(10) Patent No.: US 10,177,593 B2
(45) Date of Patent: Jan. 8, 2019

(54) ESTABLISHING A CHARGING COMMUNICATION BETWEEN CHARGING STATION AND VEHICLE

(71) Applicant: Bayerische Motoren Werke Aktiengesellschaft, Munich (DE)

(72) Inventors: Max Turner, Munich (DE); Lars Voelker, Munich (DE); Torsten Herzog, Munich (DE); Mohamed Falfoul, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/493,171

(22) Filed: Apr. 21, 2017

(65) Prior Publication Data

US 2017/0223750 A1   Aug. 3, 2017

Related U.S. Application Data

(63) Continuation of application No. PCT/EP2015/073277, filed on Oct. 8, 2015.

(30) Foreign Application Priority Data

Oct. 23, 2014   (DE) .................. 10 2014 221 559

(51) Int. Cl.
*H02J 50/90*     (2016.01)
*B60L 11/18*     (2006.01)
(Continued)

(52) U.S. Cl.
CPC ............. *H02J 7/025* (2013.01); *B60L 11/182* (2013.01); *B60L 11/1829* (2013.01);
(Continued)

(58) Field of Classification Search
CPC ....... H02J 50/80; H02J 50/90; B60L 11/1827; B60L 11/1833; B60L 11/1846; H04B 5/0037
See application file for complete search history.

(56) References Cited

U.S. PATENT DOCUMENTS 7,795,841 B2 *   9/2010   Matsumoto ........... B60L 11/182
                                                            320/108
9,739,844 B2 *   8/2017   Widmer ............. G01R 33/0047
(Continued)

FOREIGN PATENT DOCUMENTS

DE   20 2010 004 148 U1   8/2010
DE   10 2013 016 880 A1   7/2014
EP        2 612 795 A1    7/2013

OTHER PUBLICATIONS

International Search Report (PCT/ISA/210) issued in PCT Application No. PCT/EP2015/073277 dated Nov. 25, 2015 with English translation (Six (6) pages).
(Continued)

*Primary Examiner* — Duc M Nguyen
(74) *Attorney, Agent, or Firm* — Crowell & Moring LLP

(57) ABSTRACT

A method establishes a wireless communication connection between a vehicle communication unit of a vehicle and a charging station communication unit of a charging station. The method includes the transmission of a low-frequency signal via a LF transmission unit of the vehicle, wherein the LF request signal displays an identifier relating to the vehicle. The method also includes the receiving of the LF request signal via an LF receiving unit of the charging station. The method further includes the transmission of information relating to the identifier in a broadcast message via the charging station communication unit, as well as the receiving of the broadcast message via the vehicle communication unit. In addition, the method includes the checking
(Continued)

of whether the broadcast message comprises the information relating to the identifier, and the establishing of a wireless communication connection between the vehicle communication unit and the charging station communication unit, if the broadcast message comprises the information relating to the identifier.

10 Claims, 3 Drawing Sheets

(51) Int. Cl.
  *H02J 7/02* (2016.01)
  *H04W 4/04* (2009.01)
  *H02J 50/10* (2016.01)
  *H02J 50/80* (2016.01)
  *H04W 4/80* (2018.01)
  *H04W 76/10* (2018.01)

(52) U.S. Cl.
  CPC ....... *B60L 11/1833* (2013.01); *B60L 11/1838* (2013.01); *H02J 50/10* (2016.02); *H02J 50/80* (2016.02); *H02J 50/90* (2016.02); *H04W 4/046* (2013.01); *H04W 4/80* (2018.02); *H04W 76/10* (2018.02); *B60L 2230/10* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | | |
|---|---|---|---|---|
| 9,925,883 | B2* | 3/2018 | Bell | G01M 17/007 |
| 2011/0199047 | A1* | 8/2011 | Fujii | B60L 1/04 |
| | | | | 320/109 |
| 2012/0161530 | A1* | 6/2012 | Urano | H02J 7/025 |
| | | | | 307/104 |
| 2012/0239571 | A1* | 9/2012 | Boot | B60L 11/1816 |
| | | | | 705/44 |
| 2013/0038272 | A1* | 2/2013 | Sagata | B60L 11/182 |
| | | | | 320/106 |
| 2014/0001874 | A1* | 1/2014 | Nahidipour | H02J 17/00 |
| | | | | 307/104 |
| 2014/0094116 | A1* | 4/2014 | Walley | H02J 7/0004 |
| | | | | 455/41.1 |
| 2014/0354223 | A1* | 12/2014 | Lee | H02J 5/005 |
| | | | | 320/108 |
| 2015/0015419 | A1* | 1/2015 | Halker | B60L 11/1829 |
| | | | | 340/901 |
| 2015/0042168 | A1* | 2/2015 | Widmer | B60L 11/1829 |
| | | | | 307/104 |
| 2015/0189581 | A1* | 7/2015 | Katar | H04L 67/125 |
| | | | | 714/748 |
| 2016/0023558 | A1* | 1/2016 | Hika | B60L 11/182 |
| | | | | 320/108 |
| 2016/0075239 | A1* | 3/2016 | Briz | B60L 11/182 |
| | | | | 320/108 |
| 2016/0109564 | A1* | 4/2016 | Sieber | B60L 11/1829 |
| | | | | 342/27 |
| 2016/0171803 | A1* | 6/2016 | Muller | B60L 11/182 |
| | | | | 340/5.61 |
| 2016/0297314 | A1* | 10/2016 | Iwai | H02J 7/0027 |
| 2016/0352390 | A1* | 12/2016 | Park | H04B 5/0037 |

OTHER PUBLICATIONS

German-language Written Opinion (PCT/ISA/237) issued in PCT Application No. PCT/EP2015/073277 dated Nov. 25, 2015 (Five (5) pages).

German-language Search Report issued in counterpart German Application No. 10 2014 221 559.5 dated Jun. 22, 2015 with partial English translation (Twelve (12) pages).

K. Turitsyn, et al., "Robust Broadcast-Communication Control of Electric Vehicle Charging," First IEEE International Conference, Oct. 4, 2010, pp. 203-207, XP031790228 (Five (5) pages).

* cited by examiner

ESTABLISHING A CHARGING COMMUNICATION BETWEEN CHARGING STATION AND VEHICLE

CROSS REFERENCE TO RELATED APPLICATIONS

This application is a continuation of PCT International Application No. PCT/EP2015/073277, filed Oct. 8, 2015, which claims priority under 35 U.S.C. § 119 from German Patent Application No. 10 2014 221 559.5, filed Oct. 23, 2014, the entire disclosures of which are herein expressly incorporated by reference.

BACKGROUND AND SUMMARY OF THE INVENTION

The invention relates to a method and a corresponding system for establishing a communication between a charging station and a vehicle.

Vehicles with an electric drive typically have a battery, in which electrical energy for operating an electric motor of the vehicle can be stored. The battery of the vehicle can be charged with electrical energy from a power supply system. For this purpose, the battery is coupled to the power supply system in order to transfer the electrical energy from the power supply system into the battery of the vehicle. The coupling may take place in a wire-bound manner (for example by way of a charging cable) and/or a wireless manner (for example on the basis of an inductive coupling between a charging station and the vehicle).

One way that is used for the automatic, cableless, inductive charging of the battery of the vehicle is that the electrical energy is transferred to the battery by way of magnetic induction from the ground to the underfloor of the vehicle over the underfloor clearance 120. This is shown by way of example in FIG. 1. In particular, FIG. 1 shows a vehicle 100 with an energy store 103 for electrical energy (for example with a rechargeable battery 103). The vehicle 100 includes a so-called secondary coil in the vehicle underfloor, the secondary coil being connected to the energy store 103 by way of an impedance matching circuit (not shown) and a rectifier 101. The secondary coil is typically part of a so-called "Wireless Power Transfer" (WPT) vehicle unit 102.

The secondary coil of the WPT vehicle unit 102 may be positioned over a primary coil, the primary coil being fitted for example on the floor of a garage. The primary coil is typically part of a so-called WPT base unit 111. The primary coil is connected to a power supply 110 (in this document also referred to as the charging unit 110). The power supply 110 may have a radio-frequency generator, which generates an AC current (alternating current) in the primary coil of the WPT base unit 111, whereby a magnetic field is induced. This magnetic field is also referred to in this document as the electromagnetic charging field. The electromagnetic charging field may have a predefined charging field frequency range. The charging field frequency range may lie in the LF (low-frequency) range, for example at 80-90 kHz (in particular at 85 kHz).

With sufficient magnetic coupling between the primary coil of the WPT base unit 111 and the secondary coil of the WPT vehicle unit 102 over the underfloor clearance 120, a corresponding voltage, and consequently also a current, is induced in the secondary coil by the magnetic field. The induced current in the secondary coil of the WPT vehicle unit 102 is rectified by the rectifier 101 and stored in the energy store 103 (for example in the battery). Thus, electrical energy can be transferred in a wireless manner from the power supply 110 to the energy store 103 of the vehicle 100. The charging operation may be controlled in the vehicle 100 by a charging controller 105 (also referred to as the WPT controller 105). For this purpose, the charging controller 105 may be designed to communicate, for example wirelessly, with the charging unit 110 (for example with a wall box) or with the WPT base unit 111.

For an effective energy transfer by way of the electromagnetic charging field, it is typically required that the WPT vehicle unit 102 is positioned relatively accurately over the WPT base unit 111. This positioning may be assisted by determining the position of the vehicle 100 in relation to the WPT base unit 111. Furthermore, it is desirable for an efficient charging operation that a communication connection between the charging controller 105 of the vehicle 100 and the charging unit 110 is established, for example to start the charging communication for the charging operation, in a way that is efficient (i.e. as far as possible without intervention by a driver of the vehicle 100) and quick.

The present document is concerned with the technical object of establishing such a communication connection efficiently and quickly, in particular when there are a large number of possible WPT base units 111 or a large number of charging units 110.

This and other objects are achieved according to one aspect of the invention by a method for establishing a wireless communication connection between a vehicle communication unit of a vehicle and a charging station communication unit of a charging station. The charging station may be in particular a charging station for wireless (in particular inductive) and/or contactless (for example on the basis of a charging cable actuated by a robot arm) charging of an electrical energy store of the vehicle. The charging station may comprise a WPT base unit for the inductive energy transfer. The communication units may be designed to establish a wireless LAN (Local Area Network) connection (for example in accordance with IEEE 802.11). In particular, the charging station communication unit may comprise for this purpose a wireless LAN access point.

The method comprises the emitting of a low-frequency (LF) request signal by way of an LF transmitting unit of the vehicle. In this case, the LF request signal indicates an identifier with respect to the vehicle or an identifier with reference to the vehicle. In particular, the LF request signal may comprise items of information with respect to the identity of the vehicle by which the LF request signal is emitted. The LF request signal may comprise a request signal of a keyless access function and/or of a keyless engine starting function of the vehicle. A transmitting frequency of the LF transmitting unit and of the LF request signal may lie in an LF frequency range of 20-140 kHz.

The method further comprises the receiving of the LF request signal by an LF receiving unit of the charging station. The LF receiving unit of the charging station may be constructed like the receiving unit of a vehicle key with a keyless access function and/or keyless engine starting function. Typically, the LF request signal has only a very limited range (for example of 5, 4, 3 meters or less). It can consequently be inferred from the reception of the LF request signal by the LF receiving unit of the charging station that the vehicle is in a limited vicinity (which corresponds to the range of the LF request signal) of the charging station.

The method also comprises the emitting of items of information with respect to the identifier in a broadcast message by the charging station communication unit. The broadcast message may be emitted periodically (for example 10 times per second) by the charging station communication unit, in order to indicate that the charging station communication unit is within a range that makes it possible to establish a communication connection. Apart from the information with respect to the identifier of the vehicle, the broadcast message may also comprise items of information relating to the identification of the emitting charging station communication unit (for example a WLAN SSID). The broadcast message may in particular comprise a wireless LAN beacon message or a beacon message. The items of information with respect to the identifier of the vehicle may be arranged in a vendor extension of the beacon message.

The method also comprises the receiving of the broadcast message by the vehicle communication unit. The vehicle communication unit or the vehicle may then check whether the broadcast message comprises the items of information with respect to the identifier. A wireless communication connection between the vehicle communication unit and the charging station communication unit can be established if (possibly only if) it is determined that the broadcast message comprises the items of information with respect to the identifier. In particular, a request for establishing a wireless communication connection between the vehicle communication unit and the charging station communication unit may be emitted by the vehicle communication unit.

The insertion of items of information with respect to the identifier into the broadcast message makes it possible for the vehicle to determine in a cost- and time-efficient way which charging stations are in the direct vicinity of the vehicle. Furthermore, it is made possible in this way for a communication connection between the charging station and the vehicle (for example for carrying out the charging communication for a charging operation) to be established quickly.

The method may further include receiving by the vehicle communication unit a large number of broadcast messages from a corresponding large number of charging station communication units of a corresponding large number of charging stations. For example, in a parking lot or in a parking garage, charging stations may be located in adjacent parking spaces. In this case, the LF request signal may possibly be received by a number of charging station communication units of a number of charging stations. Furthermore, the vehicle communication unit may in this case receive a large number of broadcast messages from different charging station communication units, it being possible for one or more of the broadcast messages to contain the items of information with respect to the identifier of the vehicle.

The method may further include determining one or more of the large number of broadcast messages that comprise(s) the items of information with respect to the identifier. Furthermore, correspondingly one or more charging station communication units that have emitted the one or more determined broadcast messages may be determined from the large number of charging station communication units. Consequently, the one or more charging stations that are located at a distance from the vehicle that is less than or equal to the range of the LF request signal can be determined.

The method may also include selecting one of the determined one or more charging station communication units for establishing the wireless communication connection. The selection may for example be performed manually by an occupant of the vehicle. For this purpose, items of information with respect to the one or more charging stations that correspond to the one or more determined charging station communication units may be emitted, so that the occupant of the vehicle can select a suitable charging station. An optical output may possibly be generated, identifying the charging station of the selected charging station communication unit in order to facilitate positioning at the selected charging station.

The broadcast message of a charging station communication unit may further comprise items of information with respect to a signal strength with which the LF request signal was received by the charging station communication unit. On the basis of the signal strength it is possible to determine for example the relative position and/or the distance between the vehicle and the charging station. The selection of the charging station communication unit for establishing the wireless communication connection may take place in dependence on the signal strength of the LF request signal. In particular, a charging station that can be approached by the vehicle in an advantageous way may be selected.

The method may further including determining items of information with respect to a trajectory of the vehicle. In particular, a driving direction and/or a steering angle of the vehicle may be determined. The charging station communication units may then be selected for establishing the wireless communication connection (possibly also) in dependence on the items of information with respect to the trajectory of the vehicle. This allows the selection of an "approachable" charging station to be improved further.

According to a further aspect, a charging station for charging an electrical energy store of a vehicle is described. The charging station comprises an LF receiving unit, which is designed to receive a low-frequency. (LF) request signal from an LF transmitting unit of a vehicle in a vicinity of the charging station. In this case, the vicinity of the charging station is typically limited by a range of the LF request signal. The LF request signal comprises an identifier (or an ID) with respect to the vehicle.

The charging station further comprises a charging station communication unit, which is designed to emit items of information with respect to the identifier in a broadcast message. The charging station communication unit is further designed to establish a wireless communication connection between the vehicle communication unit and the charging station communication unit in response to a request from a vehicle communication unit of the vehicle.

According to a further aspect, a vehicle (in particular a road vehicle, for example a passenger car, a truck or a motorcycle) is described. The vehicle has a low-frequency, LF for short, transmitting unit, which is designed to emit an LF request signal, the LF request signal indicating an identifier with respect to the vehicle. Furthermore, the vehicle has a vehicle communication unit, which is designed to receive a broadcast message from a charging station communication unit of a charging station. The vehicle communication unit is further designed to check whether the broadcast message includes items of information with respect to the identifier. Furthermore, the vehicle communication unit is designed to initiate the establishing of a wireless communication connection between the vehicle communication unit and the charging station communication unit if the broadcast message includes items of information with respect to the identifier.

According to a further aspect, a software (SW) program is described. The SW program may be designed to be run on one or more processors (for example partly on a processor of the charging station and partly on a processor of the vehicle), in order thereby to perform the method described in this document.

According to a further aspect, a storage medium is described. The storage medium may include an SW program, which is designed to be run on a processor, in order thereby to perform the method described in this document.

It should be noted that the methods, devices and systems described in this document can be used both alone and in combination with other methods, devices and systems described in this document. Furthermore, any aspects of the methods, devices and systems described in this document may be combined with one another in various ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
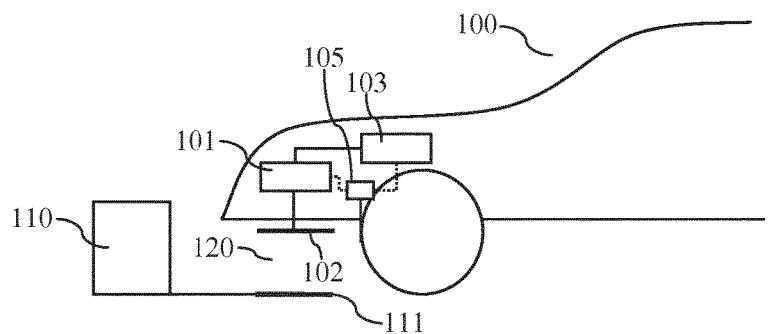
FIG. 1 is a schematic block diagram of an exemplary vehicle and charging station configuration.

As explained at the beginning, the present document is concerned with efficiently and quickly establishing a wireless communication connection between a vehicle 100 and a charging station 110. The detection of available charging stations 110, and possibly also the positioning of a vehicle 100 over the WPT base unit 111 of a charging station 110, can take place by way of low-frequency (LF) radio technology, as is used for example for functions of keyless access to vehicles 100.

Various vehicle manufacturers offer a function of keyless access (also referred to as a "Smart Key") to a vehicle 100 (at BMW, for example, under the name "Comfort Access" (CA)). The keyless access function allows a driver to open a vehicle door 210 or start the engine of the vehicle 100 without using the key-lock principle (see FIG. 2A). To open the door 210, the driver grasps the door handle 211. A proximity sensor 212 at or near the door handle 211 senses this movement. In response, a specific LF signal (LF: low frequency) is sent by way of one or more transmitting units 201 of the vehicle 100. This signal may also be referred to as a request signal. In other words, the one or more transmitting units 201 may be designed to send an electromagnetic field (in particular in the LF range), i.e. the request signal. By way of example, transmitting frequencies of the one or more transmitting units 201 lie in the frequency range of 20-140 kHz (for example 20 kHz, 124 kHz, 125 kHz, 127 kHz, 133 kHz or 135 kHz).

The electromagnetic field emitted by the one or more transmitting units 201 comprises the request signal. The emitted request signal may include a number of parts. The first part of the request signal may be designed to wake up a receiving unit 223 in a key 220 of the driver, i.e. to prepare it for receiving further items of information (see FIG. 2B). A further part of the request signal may include items of information for the identification of the vehicle 100. The different parts of the request signal emitted by the one or more transmitting units 201 may be sent at different times.

The receiving unit 223 in the key 220 is designed to receive the signals or signal parts sent by the one or more transmitting units 201 and to determine the signal strength or field strength of the signals or signal parts. Furthermore, the receiving unit 223 may be designed to determine an identifier or an identification of the transmitting unit 201 which the request signal has emitted. A key transmitting unit 221 of the key 220 responds to the received request signal with a response signal. The response signal is typically transmitted in a different (typically higher) frequency range than the request signal. For example, the response signal may be transmitted at a response frequency of 433 MHz (i.e. in the HF (high frequency) range).

Figure 2A:
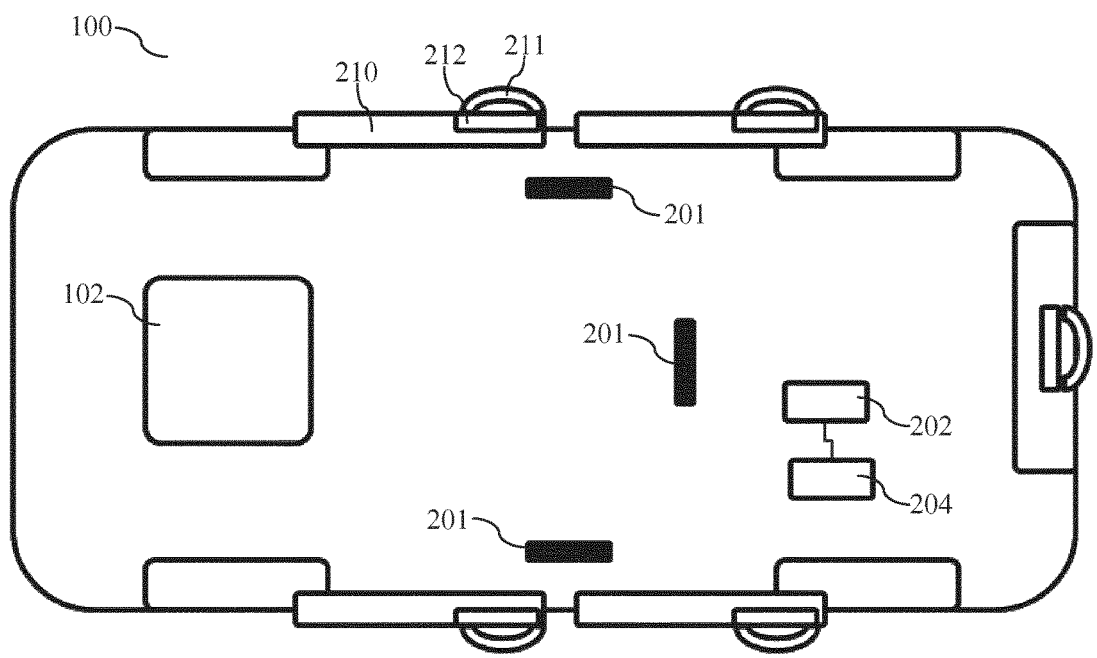
FIG. 2A is a schematic diagram of exemplary vehicle components.
Figure 2B:
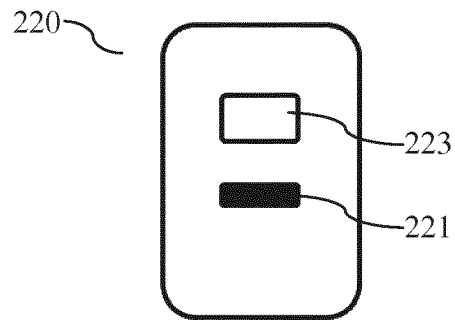
FIG. 2B is a schematic diagram of exemplary vehicle key components.

As shown in FIG. 2A, the vehicle 100 typically has a plurality of transmitting units 201. The transmitting units 201 may be arranged at different locations in the vehicle 100. Each transmitting unit 201 of the plurality of transmitting units 201 may send a request signal (for example a signal pulse). The request signals may be sent at different times from one another, and possibly have a predetermined sequence. Alternatively or additionally, the request signals may have a unique identification, which reveals from which transmitting unit 201 the request signal was emitted. By means of the identification and/or by means of the sequence of the request signals, the key 220 and/or the receiving unit 204 of the vehicle 100 can in each case be uniquely assigned to a transmitting unit 201 of the plurality of transmitting units 201. Consequently, the respective signal strength of the individual request signals, and consequently also the respective distance between the transmitting unit 201 and the receiving unit 223, can be determined. Since the transmitting units 201 are at different locations in the vehicle 100, there are consequently a plurality of distances for the corresponding plurality of transmitting units 201. On the basis of methods of triangulation, the relative position between the vehicle 100 and the receiving unit 223 can thus be determined. An orientation of the vehicle 100 with reference to the receiving unit 223 can possibly also be determined.

Figure 3:
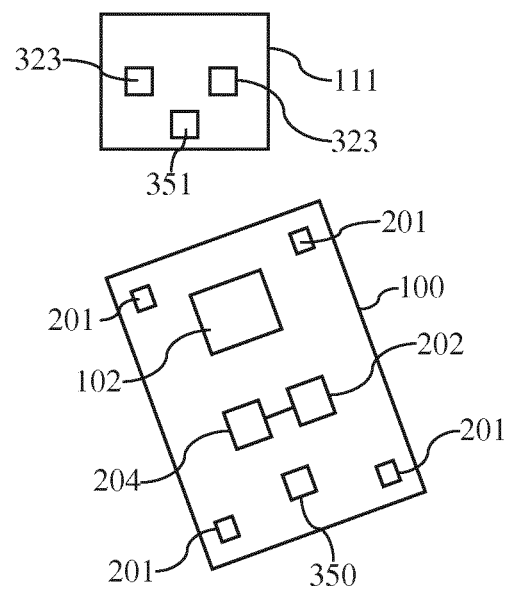
FIG. 3 illustrates an operation of positioning a vehicle over a WPT base unit.

As explained above, the method for positioning a key 220 in relation to the vehicle 100 can be adapted in an analogous way for the positioning of a vehicle 100 over a base unit 111. For this purpose, the base unit 111 may be provided with one or more receiving units 323 (by analogy with the receiving unit 223 of a key 220) for the request signals of the transmitting units 201 of an approaching vehicle 100. This is shown in FIG. 3. In particular, FIG. 3 shows a vehicle 100, which is approaching a base unit 111. The vehicle 100 is intended to be positioned in such a way that there is as little distance as possible between the base unit 111 and the vehicle unit 102.

The base unit 111 shown in FIG. 3 includes two receiving units 323 for request signals of the transmitting units 201 of the vehicle 100. The use of a plurality of receiving units 323, which are at a corresponding plurality of different locations on the base unit 111, allows the accuracy of the determination of the position of the vehicle 100 in relation to the base unit 111 to be increased. In principle, however, a single receiving unit 323 is sufficient to determine the position and/or the rotation of the vehicle 100 in relation to the base unit 111 (in particular if the vehicle 100 has a plurality of transmitting units 201). In an alternative example, the vehicle 100 may have a single transmitting unit 201. In this case, a plurality of signal strengths may be sensed by way of a plurality of receiving units 323 for the positional determination.

The controller 202 of the vehicle 100 may be designed to start a method for the positioning of the vehicle 100. In particular, the controller 202 may initiate that request signals are sent by the transmitting units 201 of the vehicle 100. For example, a driver of the vehicle 100 may initiate that the positioning process is to be started (for example by pressing a button in the vehicle 100 or by making a selection from a menu).

The one or more receiving units 323 of the base unit 111 are designed to receive the request signals and to determine a signal strength of the received request signals and send it back to the vehicle 100. A further communication method may be used for this. In particular, the vehicle 100 may include a communication unit 350, which is designed to communicate with a corresponding communication unit 351 of the base unit 111 or of the charging unit 110. The communication units 350, 351 may use for this a wireless communication method (for example WLAN or Bluetooth). The charging unit 110 can communicate with the vehicle 100 by way of the communication units 350, 351. In particular, the determined signal strengths can be transmitted to the vehicle 100 by way of the communication units 351, 350 (for example by way of WLAN). The use of the communication units 350, 351 for providing a return channel from the charging unit 110 to the vehicle 100 is advantageous, since this makes it possible to dispense with the fitting of a key transmitting unit 221 in the charging unit 110. The communication units 351, 350 are typically also required for the charging communication for carrying out a charging operation.

The controller 202 of the vehicle 100 is designed to determine on the basis of the signal strengths of the request signals the distances between the individual transmitting units 201 of the vehicle 100 and the individual receiving units 323 of the base unit 111. The position of the vehicle 100 in relation to the base unit 111 and/or the rotation of the vehicle 100 in relation to the base unit 111 can then be determined from the distances (for example by using methods of triangulation).

Figure 4:
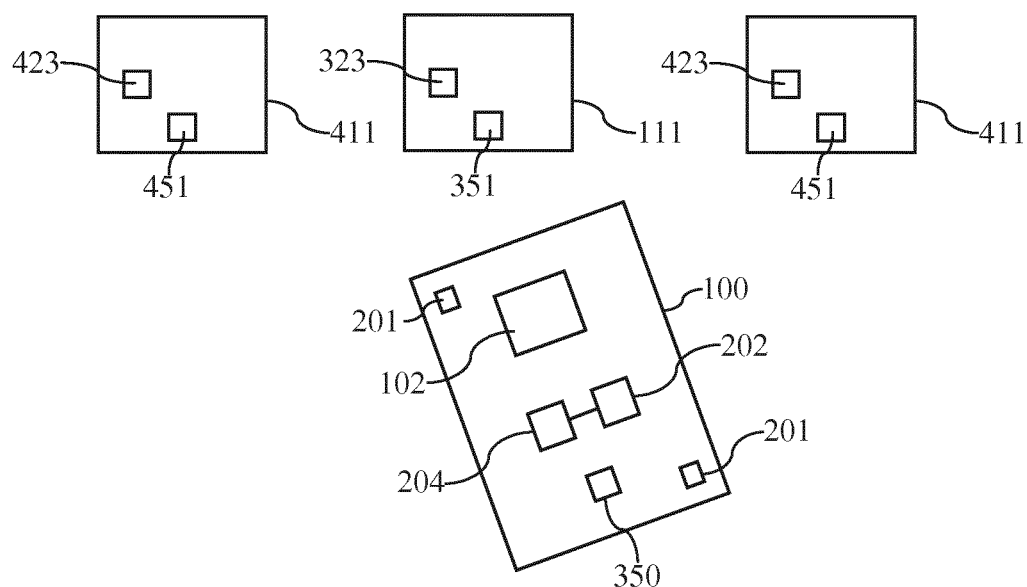
FIG. 4 illustrates an operation of positioning a vehicle when there are a large number of WPT base units.

In particular in the case of public charging devices, it may happen that there are a large number of charging stations 110 next to one another, with corresponding WPT base units 111. In such a situation, it cannot easily be ensured that the communication unit 350 of the vehicle 100 will set up a communication connection with the communication unit 351 of the charging station 110 to which the vehicle 100 is to be positioned from the large number of charging stations 110. Such a situation is shown by way of example in FIG. 4. FIG. 4 shows in particular two WPT base units 411 adjacent to the base unit 111, with receiving units 423 for request signals of the transmitting units 201 of the vehicle 100 and with communication units 451 for communication with the communication unit 350 of the vehicle 100.

As explained above, the transmitting unit 201 (also referred to as an LF transmitting unit 201) of the vehicle 100 is designed to send a request signal with an identification of the vehicle 100 and/or of the transmitting unit 201. This request signal may in particular be received and evaluated by the LF receiving unit 323 of the first base unit 111 or of the first charging station 110.

The communication unit 351 of the first base unit 111 may be designed to send one or more beacon messages. Such beacon messages may be sent at regular intervals (for example 10 times per second). Within a beacon message, for example a name of the communication unit 351 may be notified (for example an SSID, i.e. a service set identifier). The communication unit 351 may be an access point (AP), in particular a WLAN AP.

The communication unit 351 of the first base unit 111 may be designed to send items of information with respect to the identification of the LF transmitting unit 201 or of the vehicle 100 within a beacon message. The corresponding communication unit 350 of the vehicle 100 may take the identification from the beacon message, and thereby detect that the first base unit 111 has received the request signal. On the other hand, the beacon messages of the adjacent base units 411 typically do not contain the identification of the LF transmitting unit 201 or of the vehicle 100. Consequently, the communication unit 350 of the vehicle 100 can unequivocally detect with which base unit 111 a communication connection is to be established.

The vehicle 100 consequently emits messages (i.e. request signals) by way of the one or more fitted LF transmitting units 201. Different LF transmitting units 201 can be distinguished by additional bits or sub-IDs and/or by the time sequence of the request signals. One or more LF receiving units 323, 423 in the base units 111, 411 search(es) for these request signals. A base unit 111, 411 that receives at least one request signal can detect the presence of the vehicle 100, and possibly determine the relative position of the vehicle 100 in relation to the respective base unit 111, 411 (on the basis of the signal strength of a received request signal).

In dependence on the position of the vehicle 100 and/or in dependence on the range of the request signals, possibly only a subset of the available base units 111, 411 can receive request signals. The base units 111, 411 can determine (possibly in a cooperative way) on the basis of the received request signals which base unit 111 from the large number of base units 111, 411 the vehicle 100 is approaching, or over which base unit 111 the vehicle 100 is positioned. This determined base unit 111 may then emit data with respect to the one or more received request signals by means of the charging station communication unit 351 (in particular by way of a WLAN connection). In particular, an ID of the vehicle 100 or of the LF transmitting unit 201 may be emitted. Furthermore, items of information with respect to the signal strength of a received request signal may be sent. The emitted items of information may be used in a regular beacon message (for example by means of a so-called vendor extension). The emitted items of information may possibly be encrypted (for example by means of a nonce and a hash value comprising a nonce and an ID) to increase the protection of privacy.

The vehicle 100 scans for beacon messages. In particular, the vehicle communication unit 350 may scan for beacon messages. Furthermore, the beacon messages that include an ID of the vehicle 100 and/or of the LF transmitting unit 201 may be filtered out. This allows the base unit 111 and the corresponding charging station communication unit 351 with which a charging communication is to be established to be determined.

Optionally, the vehicle 100 (i.e. the vehicle communication unit 350) may sort received beacon messages in dependence on the signal strength of the request signal. In particular, possibly a number of base units 111, 411 that have received request signals may emit corresponding beacon messages. The beacon messages may contain items of information concerning the signal strength of the received request signals. On the basis of the signal strength, the vehicle 100 (i.e. the vehicle communication unit 350) can then select the base unit 111 over which the vehicle 100 is to be positioned and with which a charging communication connection is to be established. For example, the vehicle 100 may determine on the basis of the signal strengths and/or on the basis of a movement vector of its own and/or on the basis of a steering angle to which base unit 111 the vehicle 100 is being directed. A connection may then be established with the charging station communication unit 351 of this base unit 111.

This allows a list, possibly a sorted list, of available base units 111, 411 to be determined. The vehicle communication unit 350 of the vehicle 100 may establish, possibly stage by stage, a communication connection with the charging station communication units 351, 451 of the base units 111, 411 from the list of available base units 111, 411, in order to make positioning possible and/or set up a charging operation. As soon as a suitable base unit 111 is identified, the scanning of the base units from the list of available base units 111, 411 can be discontinued.

The selected base unit 111 may be designed to signal to a driver of the vehicle 100 visually (for example by built-in lights) that the charging operation is to take place by means of the selected base unit 111. Alternatively or additionally, the vehicle 100 may show the driver on a display items of information concerning the selected base unit 111 (or concerning the list of identified base units 111, 411).

The method described in this document allows a communication connection between a vehicle 100 and a charging station 110 from a large number of adjacent charging stations 110 to be established in a cost- and time-efficient way. The method described can be easily used and makes it possible to establish dependable communication connections.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a wireless communication connection between a vehicle communication unit of a vehicle and a charging station communication unit of a charging station, the method comprising the acts of:
    emitting respective low-frequency (LF) request signals via a plurality of LF transmitting units of the vehicle, wherein the LF request signals indicate an identifier with respect to the vehicle and wherein the LF request signals comprise a request signal of a keyless access function and/or of a keyless engine starting function of the vehicle;
    receiving the LF request signals by an LF receiving unit of the charging station, wherein the LF receiving unit is constructed like a receiving unit of a vehicle key with a keyless access function and/or a keyless engine starting function;
    emitting items of information with respect to the identifier in a broadcast message by the charging station communication unit, wherein the broadcast message by the charging station communication unit further comprises items of information with respect to respective signal strengths with which the LF request signals were received by the charging station communication unit; and
    receiving the broadcast message by the vehicle communication unit;
    checking whether the broadcast message comprises the items of information with respect to the identifier; and
    establishing a wireless communication connection between the vehicle communication unit and the charging station communication unit if the broadcast message comprises the items of information with respect to the identifier.

2. The method as claimed in claim 1, the method further comprising the acts of:
    receiving, by the vehicle communication unit, a large number of broadcast messages from a corresponding large number of charging station communication units of a corresponding large number of charging stations;
    determining one or more of the large number of broadcast messages that include the items of information with respect to the identifier and the signal strengths;
    determining one or more charging station communication units that have emitted the one or more determined broadcast messages from the large number of charging station communication units; and
    selecting one of the determined one or more charging station communication units for establishing the wireless communication connection.

3. The method as claimed in claim 2, wherein
    the charging station communication unit is selected for establishing the wireless communication connection in dependence on the signal strengths of the LF request signals.

4. The method as claimed in claim 2, wherein
    the method further comprises determining items of information with respect to a trajectory of the vehicle, and
    the charging station communication unit is selected for establishing the wireless communication connection in dependence on the items of information with respect to the trajectory of the vehicle.

5. The method as claimed in claim 2, further comprising the act of:
    generating a signal to a driver of the vehicle, by which the charging station of the selected charging station communication unit is identified.

6. The method as claimed in claim 2, further comprising the act of:
    outputting items of information with respect to the one or more charging stations that correspond to the one or more determined charging station communication units.

7. The method as claimed in claim 1, wherein a transmitting frequency of the LF transmitting units lie in an LF frequency range of 20-140 kHz.

8. The method as claimed in claim 1, wherein
    the wireless communication connection comprises a wireless LAN connection,
    the charging station communication unit comprises a wireless LAN access point and
    the broadcast message comprises a wireless LAN beacon message.

9. A charging station for charging an electrical energy store of a vehicle, comprising:
    a low-frequency (LF) receiving unit, which is configured to receive respective low-frequency request signals from a plurality of LF transmitting units of a vehicle in a vicinity of the charging station, wherein the LF request signals indicate an identifier with respect to the vehicle and wherein the LF request signals comprise a request signal of a keyless access function and/or of a keyless engine starting function of the vehicle, and wherein the LF receiving unit is constructed like a receiving unit of a vehicle key with a keyless access function and/or a keyless engine starting function; and a charging station communication unit, which is configured to emit items of information with respect to the identifier in a broadcast message, wherein the broadcast message further comprises items of information with respect to respective signal strengths with which the LF request signals were received by the LF receiving unit, and in response to a request by a vehicle communication unit of the vehicle to establish a wireless communication connection between the vehicle communication unit and the charging station communication unit.

10. A vehicle, comprising:

a plurality of low-frequency (LF) transmitting units, which are configured to emit respective LF request signals, wherein the LF request signals indicate an identifier with respect to the vehicle and wherein the LF request signals comprise a request signal of a keyless access function and/or of a keyless engine starting function of the vehicle; and a vehicle communication unit, which is configured to:

receive a broadcast message from a charging station communication unit of a charging station, wherein the charging station includes an LF receiving unit which is configured to receive the LF request signals and wherein the LF receiving unit is constructed like a receiving unit of a vehicle key with a keyless access function and/or a keyless engine starting function;

check whether the broadcast message comprises items of information with respect to the identifier, wherein the broadcast message further comprises items of information with respect to respective signal strengths with which the LF request signals were received by the charging station communication unit; and initiate the establishing of a wireless communication connection between the vehicle communication unit and the charging station communication unit if the broadcast message comprises items of information with respect to the identifier.

* * * * *